United States Patent [19]
Stolfus

[11] Patent Number: 5,140,262
[45] Date of Patent: Aug. 18, 1992

[54] GEARTOOTH SENSOR WITH A CENTERLINE IN NONINTERSECTING RELATION WITH A CENTER OF ROTATION OF A ROTATABLE MEMBER

[75] Inventor: Joel D. Stolfus, Freeport, Ill.

[73] Assignee: Honeywell Inc., Minneapolis, Minn.

[21] Appl. No.: 725,122

[22] Filed: Jul. 2, 1991

[51] Int. Cl.⁵ .......................... G01B 7/30; G01B 7/14; G01P 3/44; F02P 17/00
[52] U.S. Cl. ............................... 324/207.2; 123/617; 324/174; 324/207.12; 324/207.25
[58] Field of Search ................. 324/173, 174, 207.12, 324/207.2, 207.21, 207.25, 251, 252; 123/617

[56] References Cited

U.S. PATENT DOCUMENTS

| | | | |
|---|---|---|---|
| 3,742,243 | 6/1973 | Gamble | 324/174 X |
| 4,373,486 | 2/1983 | Nichols et al. | |
| 4,524,932 | 6/1985 | Bodziak | |
| 4,677,378 | 6/1987 | Tokura et al. | |
| 4,719,419 | 1/1988 | Dawley | |
| 4,829,248 | 5/1989 | Loubier | 324/207.2 |
| 4,847,555 | 7/1989 | Stammer et al. | 324/173 X |
| 5,019,776 | 5/1991 | Kawamata et al. | 324/207.21 |

FOREIGN PATENT DOCUMENTS 122602 3/1986 U.S.S.R. ............... 324/207.2

Primary Examiner—Gerard R. Strecker
Attorney, Agent, or Firm—William D. Lanyi

[57] ABSTRACT

An off axis geartooth sensor is provided with a center line of the sensor disposed along a line which is not coincident with the center of rotation of the rotatable member to be sensed. Instead, the center line of the housing in which a Hall Effect element is disposed is positioned at a perpendicular distance from the center of rotation of the rotatable member which is determined as the function of a range of dimensions which define the allowable gap between the Hall Effect element and a surface of the rotatable member. The perpendicular distance between the center of rotation and the line along which the proximity sensor is disposed is mathematically determined as a function of the distances between the center of rotation of the rotatable member and the minimum and maximum possible locations of the Hall Effect element along with the angular distance between those two dimensions. The present invention provides a geartooth sensor which is significantly immune to changes in the gap between a Hall Effect element and the surface of a rotatable member which is being sensed. The rotatable member is provided with a least one discontinuity in its surface which causes changes in the magnetic field surrounding a Hall Effect element and, as a result, provides a signal from the Hall Effect element to indicate the proximity of the discontinuity to the Hall Effect element.

17 Claims, 3 Drawing Sheets

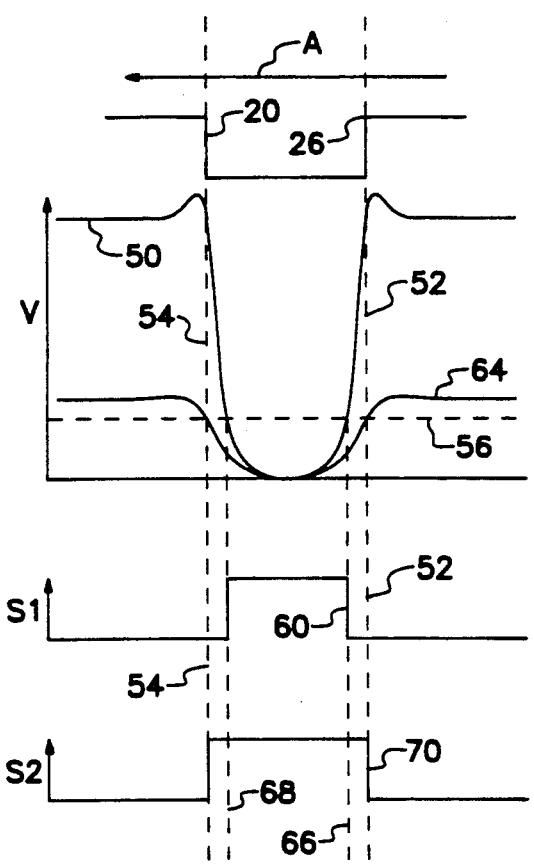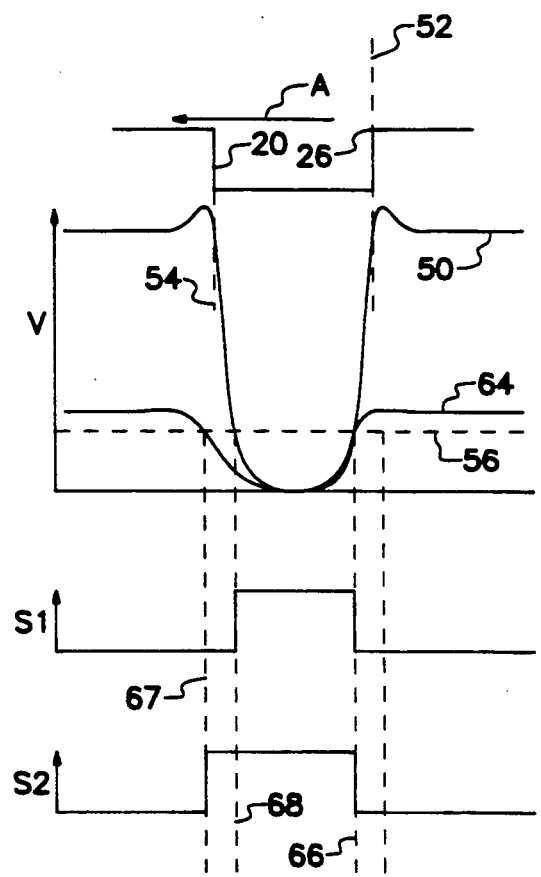
Fig. 3
Fig. 4

GEARTOOTH SENSOR WITH A CENTERLINE IN NONINTERSECTING RELATION WITH A CENTER OF ROTATION OF A ROTATABLE MEMBER

BACKGROUND OF THE INVENTION

1. Field of the Invention

The present invention relates generally to a geartooth sensor and, more particularly, to a geartooth sensor that is disposed in an off axis relationship with the center of rotation of a rotatable member having one or more discontinuities in its surface.

2. Description of the Prior Art

Many different types of geartooth sensors are known to those skilled in the art. One particular type of sensor utilizes a Hall Effect element disposed in a housing which, in many applications, is generally cylindrical with an operative face at one end of the housing. A sensing element, such as a Hall Effect element, is disposed within the housing in association with related circuitry that is connected in electrical communication with the Hall Effect element.

U.S. Pat. No. 4,373,486, which issued to Nichols et al on Feb. 15, 1983, discloses a rotational position and velocity sensor for use with a ferrous disk which is rotatable driven by an internal combustion engine shaft. The disk is provided with inner and outer circular rims, wherein the outer rim has two notches of a predetermined length and position and the inner rim has three notches of predetermined length and position. A permanent magnet is mounted between and radially spaced from two Hall Effect sensor devices in fixed relation to the shaft axis such that the outer rim passes between one Hall Effect device and the magnet and the second rim passes between the second Hall Effect device and the magnet as the shaft is rotated. The notches are positioned to provide four separate two digit binary outputs to a micro processor that provides output signals to ignition coil drivers for the spark ignition devices of the engine and provides spark advancement and coil dwell time variation in accordance with shaft rotational speed and other engine operating conditions.

U.S. Pat. No. 4,524,932, which issue to Bodziak on Jun. 25, 1985, describes a railroad car wheel detector which utilizes a Hall Effect element. The Hall Effect element is incorporated into an integrated circuit with temperature compensation, voltage regulation and amplification. It is mounted on top of a permanent magnet which is made of ceramic material with the critical Hall axis aligned with the magnet pull axis. The permanent magnet and Hall cell assembly is mounted on the rail at a predetermined distance below the top of the rail so that the flange of passing wheels occupies the air gap between the magnet and the rail through which the major portion of the magnetic flux flows. Reduction of the air gap increases the level of the magnet flux and thus the level of voltage output of the Hall cell.

U.S. Pat. No. 4,677,378, which issued to Tokura et al on Jun. 30, 1987, discloses a displacement center which includes a magnetically responsive member and a pair of piezoelectric elements. The sensor is provided with first and second piezoelectric elements, a pair of electrodes at one and the other ends of each of the first and second piezoelectric elements, a permanent magnet which is mechanically fixed to one end of the first piezoelectric element, a small piece which is mechanically fixed to one end of the second piezoelectric element and having approximately identical weight as that of the permanent magnet. It also comprises a base plate to which the other end's first and second piezoelectric elements are mechanically fixed. The preferred embodiment of this invention is illustrated and described in association with a plurality of gearteeth of a rotatable member.

U.S. Pat. No. 4,719,419, which issued to Dawley on Jan. 12, 1988, describes an apparatus that is used for detecting the position of a rotary shaft. It is a non-contact rotary position sensor for measuring rotary position of a shaft and includes an annular magnetic member mounted for rotation with the shaft and a Hall Effect device spaced from the shaft. The annular magnetic membrane includes a magnetic pole pair radially oriented. The magnetic field produced radially outwardly from the annular magnetic member is monopolar. In one embodiment, the annular magnetic member is circular and produces a magnetic field having a uniform magnetic flux density around its entire circumference at equidistant locations extending radially outwardly of the annular magnetic member and the annular magnetic member is mounted eccentric with respect to the shaft.

When a geartooth sensor is associated with a rotatable member, such as a gear, for the purpose of measuring the rotational speed of the rotatable member or, alternatively, its angular position, the Hall Effect element is commonly associated with a biasing magnet that is disposed proximate the Hall Effect element within the housing with the Hall Effect element being disposed between the biasing magnet and the rotatable member. The biasing magnet provides a magnetic field that affects the operation of the Hall Effect element when the proximity of a magnetic material, such as the rotatable member, distorts the magnetic field which is sensed by the Hall Effect element. To facilitate this type of sensing operation, the rotatable member is provided with at least one discontinuity in its surface. In many applications, a single depression is provided in the rotatable member while in other applications a plurality of gearteeth are disposed around the periphery of the rotatable member for sensing by the geartooth sensor.

In a typical application of a geartooth sensor, both the rotatable member and the sensor are disposed within a common apparatus such as an internal combustion engine. The rotatable member can be attached to a camshaft while the geartooth sensor is disposed in an opening within the body of the internal combustion engine. The geartooth sensor is typically disposed in the opening of an engine with the Hall Effect element being locate proximate the surface of the rotatable member.

Because of normal machining tolerances involved in the construction of the engine, or other similar apparatus in which the sensor is to be used, it is difficult to predict the precise distance between the Hall Effect element and the surface of the rotatable member which comprises the one or more discontinuities. Since it is important that the geartooth sensor provide a signal at a precise point of rotation for each discontinuity that it senses, these tolerances can create severe problems during operation of the engine. As will be described in greater detail below, the variation in distance between the Hall Effect element and the surface of the rotatable member can cause the Hall Effect element to sense a discontinuity at different angular positions of the rotatable member, depending on the distance between the Hall Effect element and the surface of the rotatable member. This variation in actuation position of the geartooth sensor can create severe problems since the geartooth sensor is typically used in operations such a the timing of the operation of the engine. It is therefore beneficial to provide a geartooth sensor for these types of applications in which the variability of sensor position caused by the build up of manufacturing tolerances does not adversely affect the angular position of the rotatable member at which the geartooth sensor reacts to the position of a discontinuity in the surface of the rotatable member. This advantage can be provided by a geartooth sensor which is essentially immune to variations in the location of its Hal Effect element relative to the surface of the rotatable member.

SUMMARY OF THE INVENTION

The present invention provides a geartooth sensor which is configured to compensate for variations in the position of its Hall Effect element relative to the surface of a rotatable member and to provide actuation of the Hall Effect element by a discontinuity in the surface of the rotatable member at a constant angular position of the rotatable member even though the distance between the Hall Effect element of the geartooth sensor may vary within a range of distances. For all of those distances within a predetermined range, the present invention will provide actuation of the Hall Effect element, by the discontinuity, at essentially the same angular position. It should be understood that the discontinuity in the surface could be a single tooth or depression, a plurality of teeth, one magnet or a plurality of magnets.

In a preferred embodiment of the geartooth sensor of the present invention, the device comprises a sensor which is responsive to a change in magnetic field strength. The sensor, which is a Hall Effect element in a preferred embodiment of the present invention, is disposed within a housing which, in turn, is disposable at a location proximate a rotatable member which has at least one magnetic field affecting discontinuity in its surface. The housing is located at a position which places the sensor at a predetermined distance from the surface of the rotatable member, wherein the predetermined distance comprises a range of positions which can be defined along a line that is located at a perpendicular distance from the center of rotation of the rotatable member. The perpendicular distance between the line on which the range of positions is located and the center of the rotatable member is determined as a function of the range of positions.

BRIEF DESCRIPTION OF THE DRAWING

The present invention will be more fully understood from a reading of the Description of the Preferred Embodiment in conjunction with the drawing, in which:

FIG. 3 shows the relationship between variations in sensor position and signals received from an associated Hall Effect element;

FIG. 4 shows the relationship between signals received from a Hall Effect element and variations in position between the Hall Effect element and the surface of a rotatable member;

DESCRIPTION OF THE PREFERRED EMBODIMENT

Figure 1:
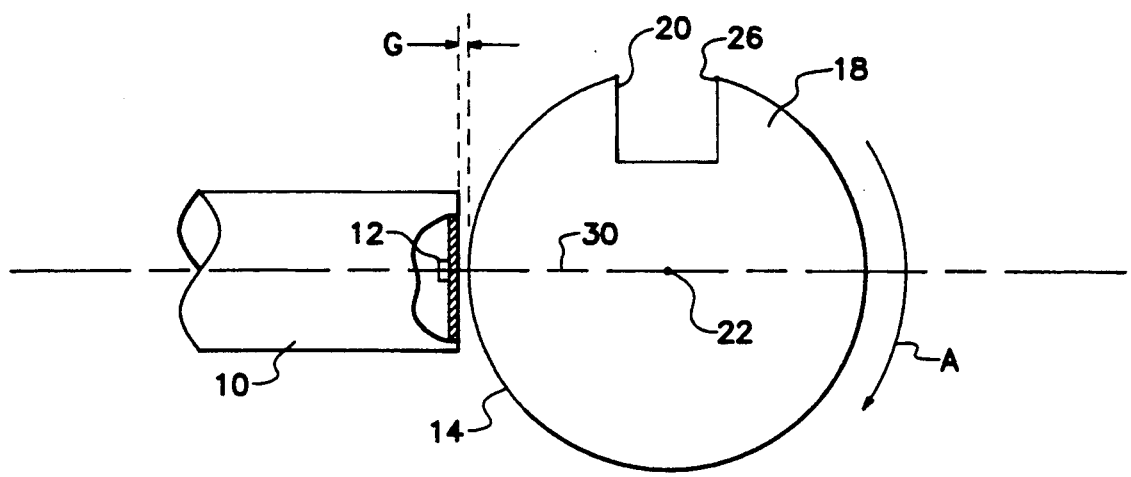
FIG. 1 illustrates a geartooth sensor arrangement known to those skilled in art.

Throughout the Description of the Preferred Embodiment, like components will be identified by like reference numerals.

FIG. 1 shows a geartooth sensor arrangement which is generally known to those skilled in the art. A proximity detector 10, with a sensor 12 disposed within it, is located proximate a surface 14 of a rotatable member 18. The surface 14 has a least one discontinuity 20 within it which can affect a magnetic field. The distance between the Hall Effect sensor 12 and the surface 14 of the rotatable member 18 is identified by the letter G which represents the gap between the Hall Effect element 12 and the surface 14. As the rotatable member 18 rotate about its center of rotation 22 in the direction indicated by arrow A, the discontinuity 20 will repeatedly pass the Hall Effect element 12. Although not particularly shown in FIG. 1, it should be understood that a magnet is disposed within the housing 10 behind the Hall Effect element 12, with the Hall Effect element 12 being disposed between the magnet and the surface 14 of the rotatable member 18. The magnet provides a biasing magnetic field in which the Hall Effect element 12 is disposed according to well known biasing techniques. The presence of ferrous material, such as that of which the rotatable member 18 is comprised, distorts the magnetic field. When the discontinuity 20 passes the Hall Effect element 12, the shape and/or strength of the magnetic field changes and this change in the magnetic field is sensed by the Hall Effect element 12 and, as a result, a corresponding signal is provided. However, variations in dimension G can cause variations in the angular position of the rotatable member 18 at which a signal is received from the Hall Effect element 12.

It should be realized that the Hall Effect element 12 reacts to the change in the magnetic field strength at the Hall element which is caused by the discontinuity 20. Typically, that change in magnetic field influenced by the presence of the discontinuity 20 will occur when point 26 reaches a certain position relative to the Hall Effect element 12. As the gap G changes as a result of manufacturing variations from one assembled unit to another, the angular position of the rotatable member 18 at which point 26 affects the magnetic field at the Hall Effect element 12 can also change. If the configuration shown in FIG. 1 is intended for use in accurately determining the rotational position of the rotatable member 18, such as a cam shaft indicator, this variation in signal timing which results from variations in the gap G can cause severely deleterious results in the operation of the engine. It should be noted that the housing 10 is typically cylindrical in shape and is assembled proximate the rotatable member 18 with the central axis of the housing 10 lying on a line 30 which intersects the center of rotation 22 of the rotatable member 18. This is the usual configuration used in geartooth sensors.

It should also be realized that tolerance in manufacturing accuracy can affect the magnitude of gap G. For example, the tolerance related to the diameter of the rotatable member 18 and the tolerance related to the location of the center of rotation 22 can possible be additive and can severely change the magnitude of gap G. Furthermore, when the housing 10 is disposed at its location proximate the rotatable member 18, there can also be variations in its position. If all of these tolerances combine in the same direction, a severe change in gap G can result. That possible variation in the magnitude of gap G can cause serious errors in the operation of the associated internal combustion engine because of the resulting variability in the angular position of point 26 at which a signal is provided by the Hall Effect element 12. The purpose of the present invention is to accommodate these possibly additive tolerances and provide a geartooth sensor which is generally immune to those possible variations in gap G.

Figure 2:
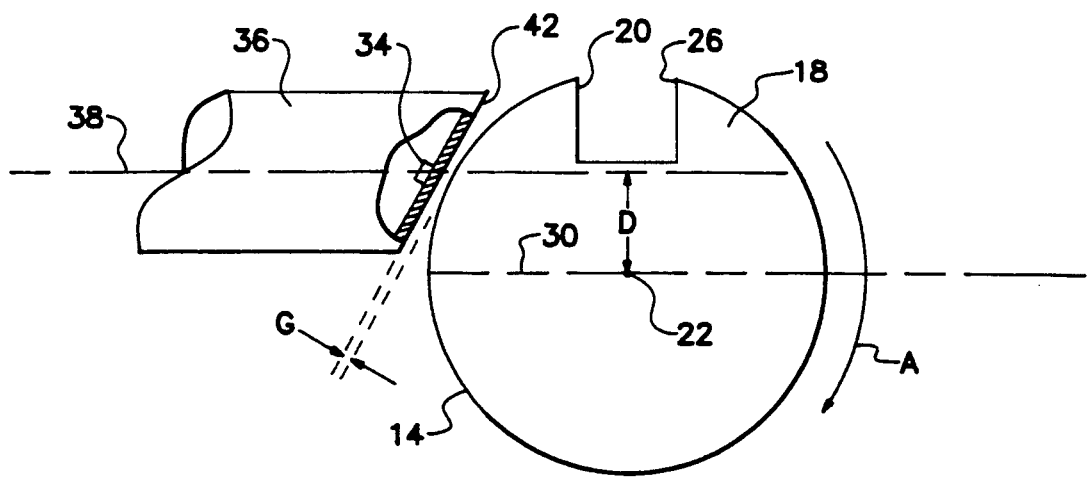
FIG. 2 shows the geartooth sensor arrangement of the present invention.

FIG. 2 shows a preferred embodiment of the present invention. It provides a Hall Effect element 34 within a housing 36. It should be understood that the general structure of the Hall Effect element 34 is similar to that of the Hall Effect element 12 shown in FIG. 1 and, additionally, it should be understood that the housing 36 performs a generally similar function to the housing 10. However, several significant differences between the present invention and the device shown in FIG. 1 should be understood. Most importantly, the housing 36 of the present invention is disposed with its centerline 38 located a perpendicular distance D from the center of rotation 22 of the rotatable member 18. By comparing FIGS. 1 and 2, it can be seen that the centerline of housing 10 in FIG. 1 intersects the center of rotation 22, whereas the centerline 38 of the present invention housing does not intersect the center of rotation 22 but, instead, lies a perpendicular distance D from that center of rotation. Although the invention is described in terms of its centerline, it should be clearly understood that this terminology refers to the line along which the sensor is assembled relative to the rotatable member and, therefore, the line along which errors in position between the sensor and the rotatable member will occur. For example, the sensor can be positioned too close to or too far from the rotatable member along the centerline which is the most likely direction of insertion of the housing 36 toward the rotatable member 18 during assembly. It should also be clearly understood that the sensor does not have to be cylindrical to incorporate the principles of the present invention.

As in the configuration of FIG. 1, the present invention disposes the Hall Effect element 34 at a distance from the surface 14 which is identified as gap G. As described above, gap G can vary significantly because of potential deviations in the manufacturing of the internal combustion engine. For example, the specific location of the center of rotation 22 can vary because of machining tolerances and the diameter of the rotatable member 18 can also vary. Similarly, when the housing 36 is disposed within the body of the internal combustion engine to place the Hall Effect element 34 proximate the surface 14 of the rotatable member 18, variations in manufacturing accuracy of the sensor or its position in the engine can also change the magnitude of gap G. However, the perpendicular distance D between line 38 and the center of rotation 22 allows the present invention to provide a signal which indicates the location of point 26 proximate the Hall Effect element 34 with significantly improved accuracy and increased immunity to variations in the size of gap G.

· With continued reference to FIG. 2, it should be noted that the front face 42 of the housing 36 is shown positioned at a specific angle to the centerline 38 of the housing to accommodate the position of the housing 36 along line 38. It should also be understood that the angular relationship between face 42 and centerline 38 is not a requirement to the operation of the present invention but, instead, a convenient design choice that facilitates the positioning of the housing 36 in close proximity to the surface 14 of the rotatable member 18.

The dimensions of the present invention are structured in response to a predicted variation in gap G. Typically, the predicted variation can be determined with a high degree of accuracy based on the known allowable tolerances for each of the associated components. For example, a manufacturer of internal combustion engines can accurately determine and control the allowable tolerances in the location of the center of rotation 22, the diameter of the rotatable member 18 and the dimensions of the opening into which the housing 36 is disposed during assembly. Although the precise position of the Hall Effect element 34 is difficult to predict in relation to the surface 14 of the rotatable member 18, a range of locations of the Hall Effect element 34 can be accurately predicted based on the sum of the tolerances that affect those relative positions. These techniques for predicting tolerance stackup are well known to those skilled in the art and will not be described in detail herein.

FIGS. 3 and 4 illustrate the relationship between the signals received from a Hall Effect element 34 and variations in gap G. For purposes of clarity, the direction of movement of the discontinuity in FIGS. 3 and 4 is shown moving from right to left to permit the various signals to be illustrated as a function of time from left to right. In FIG. 3, a discontinuity 20 with point 26 is shown as a linear structure as opposed to a circular one for ease in explaining the phenomenon of Hall Effect elements in this type of application. Arrow A indicates the direction of travel of the discontinuity 20 and point 26 relative to a Hall element. Directly below the discontinuity 20 in FIG. 3, the voltage signal provided by the Hall Effect element 34 is illustrated for two different situations. Curve 50 illustrates the signal variation provided by the Hall Effect element 34 at a minimum magnitude of gap G. As you can see, the maximum signal represented by curve 50 occurs as the non-discontinuous portion of the surface 14 passes proximate the Hall Effect element 34. When point 26 passes into its effective zone relative to the Hall Effect element 34, the signal provided by the Hall Effect element drops rapidly as indicated by line 54. The signal remains low until the discontinuity 20 passes the Hall Effect element at which time the Hall Effect element 34 again provides its maximum signal at the time represented by dashed line 52. Where curve 50 crosses a reference voltage line 56, at timing lines 66 and 68, a signal change is sensed by associated circuitry to provide the signal identified as S1 which is generally a square wave represented by line 60. Because of the close proximity of the Hall Effect element 34 to the surface 14 of rotatable member 18, the square wave 60 accurately represents the time during which the discontinuity 20 is proximate the Hall Effect element 34. That square wave is identified as S1 in FIG. 3. However, if gap G is larger, the signal strength provided by the Hall Effect element 34 is significantly reduced. Referring again to the illustration of the Hall voltage in FIG. 3, it can be seen by curve 64 that the maximum signal strength is significantly reduced because of the increased distance between the Hall Effect element 34 and the surface 14 of the rotatable member 18. Because of the increased distance between the surface 14 and the Hall Effect element 34, curve 64 represents the changes in the Hall voltage as a result of the passage of the discontinuity 20 proximate the Hall Effect element 34. As can also be seen in FIG. 3, curve 64 crosses the threshold voltage 56 at different points in time than curve 50. Those points in time are represented by dashed lines 52 and 54. Since the associated circuitry is configured to react to the relationship between curve 64, or curve 50, and the reference voltage 56, the resulting square wave when the gap G is increased changes and is identified by reference numeral 70 in FIG. 3. As can be seen, a significant angular change, which is represented by the distance between dashed lines 52 and 66, has occurred. Although the signal strength of signal S2 is generally identical to the signal strength of signal S1, its timing change can cause a significant degradation in the operation of the engine. FIG. 3 illustrates the relationship between changes in gap G and the timing of the signal, S1 or S2, provided by the geartooth sensor.

In determining the configuration of the present invention, the predicted variation in gap G is used to determine the most beneficial dimension D to be provided between the line 38 and the center of rotation 22 shown in FIG. 2. When the gap G variation is identified, the change in the firing angle, represented by the distance between dashed lines 52 and 66, is empirically determined at the two extreme locations of gap G, the minimum and maximum dimensions. For example, the precise location of dashed line 66 for the minimum magnitude of gap G is empirically determined followed by another determination with a maximum gap G to identify the location of dashed lines 52. When these two are known, dimension D in FIG. 2 can be mathematically determined.

FIG. 4 shows the results achieved by the location of the present invention at a position shown in FIG. 2. The particular mathematical determination of dimension D will be described below in association with FIG. 5. However, with reference to FIG. 4, it can be seen that curve 64 is shifted to the left by a magnitude which places dashed line 66 at the coincident intersections of curves 50 and 64 and line 56. This results in a delay of the firing angle of essentially zero when point 26 passes the Hall Effect element 34 at either of the two extremes of the range of magnitude of gap G. As a result, the present invention provides a consistent timing signal at a constant angle of rotation regardless of the magnitude of gap G, as long as gap G is within the originally predicted range of dimensions.

Figure 5:
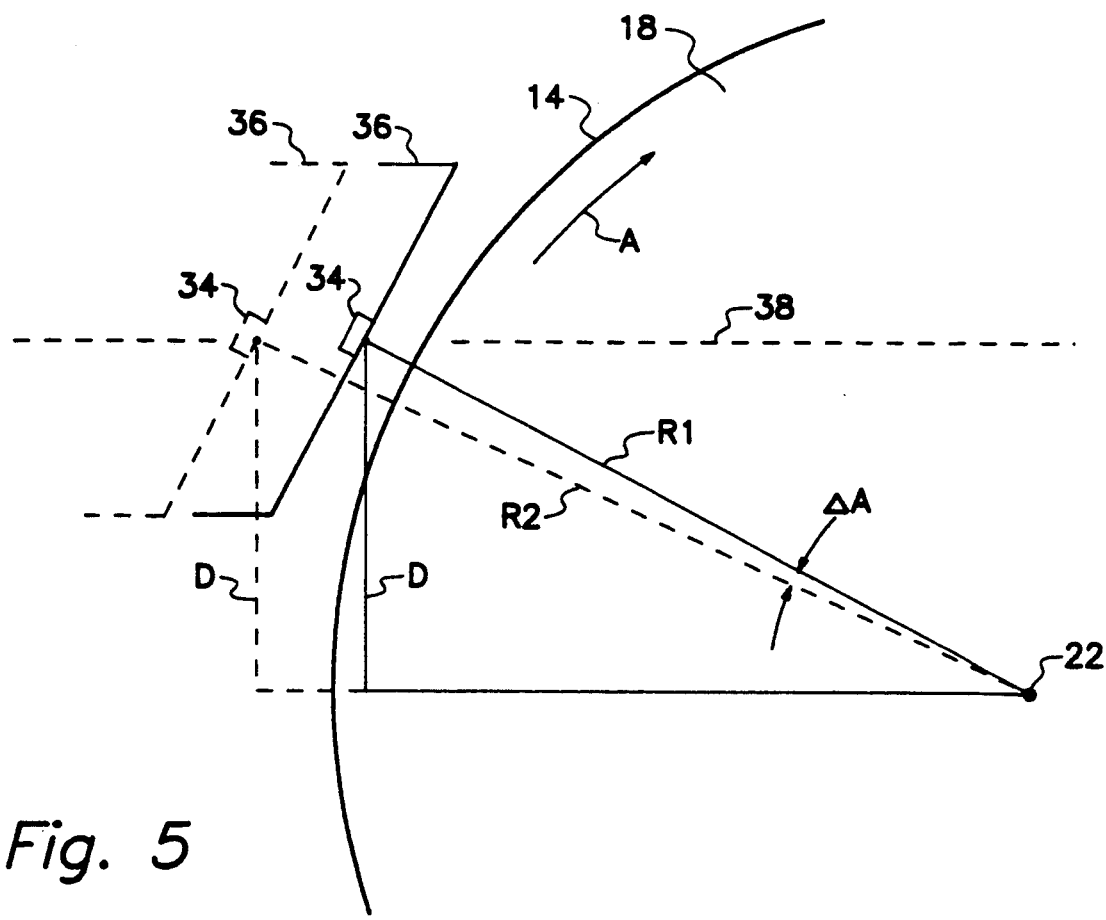
FIG. 5 is a schematic representation used to describe the calculations which determine the location of the present invention.

FIG. 5 shows a geometric relationship between the two extreme positions of the Hall Effect element 34 relative to the surface 14 of the rotatable member 18. It should be understood that the rotatable element 18 is only shown as a curved line that represents the surface 14 for purposes of the geometric analysis which will be described below. It can be seen in FIG. 5 that two alternative positions of the Hall Effect element 34 are shown with each of the Hall Effect element positions being illustrated in its own representative housing 36. The two positions are represented by dashed lines and solid lines. It should be clearly understood that these positions represent the range of positions resulting from the normal variations associated with accumulative manufacturing tolerances. These extreme positions of the Hall Effect element 34 are each associated with triangles which are also alternatively shown by solid and dashed lines. Line R1 represents the distance between the center of rotation 22 and the Hall Effect element 34 when the Hall Effect element 34 is at its closest position to the surface 14 within the predicted range of positions of gap G. Similarly, line R2 represents the maximum distance between the center of rotation 22 and the Hall Effect element 34 within the predicted range of dimensions of gap G. The angular difference between lines R1 and R2, as determined above between lines 52 and 66, is identified as ΔA. When the magnitudes of lines R1 and R2 are known and the magnitude of angle ΔA is known, the magnitude of distance D can then be determined in order to correctly position the housing 36 on a line identified by reference numeral 38. As described above, dimension D is the perpendicular distance between the center of rotation and the line determined by R1, R2 and ΔA. It should be understood that the variations in tolerances will combine to form different effective dimensions, depending on where those dimensions are calculated. While the manufacturer of the internal combustion engine will probably determine specific variations for specific components, such as the location of the center of rotation 22 or the diameter of the rotatable member 18, those values can be used to define the magnitudes of R1 and R2 and to determine the variation measured along line 38. The relationship between the differences in magnitudes of lines R1 and R2 and the magnitude of angle ΔA can be used to mathematically determine the desired magnitude of dimension D by the relationship $$D = \frac{R1*R2*\sin(\Delta A)}{(R1^2 + R2^2 - 2R1*R2*\cos(\Delta A))^z}$$

where R1 is the length of line R1 in FIG. 5, which represents the distance between the center of rotation 22 and the Hall Effect element 34 at the minimum predicted gap G, R2 represents the magnitude of line R2 in FIG. 5, which is the distance between the center of rotation 22 and the Hall Effect element 34 at the maximum dimension of predicted gap G, angle ΔA is the magnitude of the angle between lines R1 and R2 determined from FIG. 4, z equals 0.5 and D is the perpendicular distance between line 38 in FIG. 5 and the center of rotation 22. It should be understood that, within the scope of the present invention, the magnitude of D does not have to be precise without any allowable variability. Instead, it represents a desired position which, in itself, has an allowable tolerance.

Figure 6:
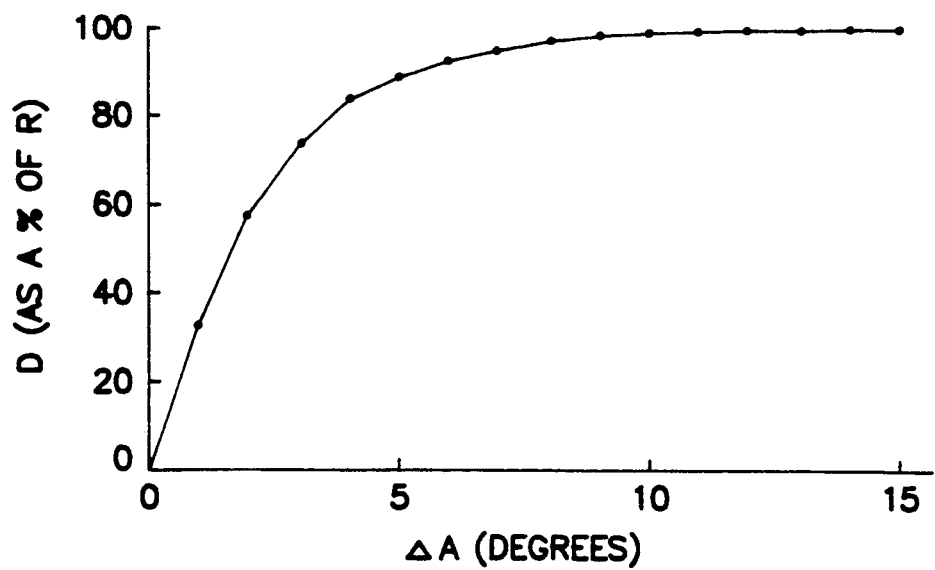
FIG. 6 shows exemplary results of the calculations described in conjunction with FIG. 5.

As ΔA changes in association with differences in magnitudes of lines R1 and R2, the magnitude of dimension D will also change. For a representative rotatable member 18, the variations in dimension D are shown in FIG. 6 as a function of angle ΔA. As can be seen in FIG. 6, small magnitudes of ΔA result in relatively large changes in the magnitude of dimension D, whereas larger magnitudes of angle ΔA result in successively smaller changes in dimension D. Each particular application of the present invention will depend significantly on the relative dimensions of the diameter of the rotatable member, the minimum and maximum magnitudes of gap G and the allowable tolerances in that particular application. In FIG. 6, dimension D is illustrated as a percentage of the minimum radius R1 of the rotatable member. It should be understood that variations in the magnitudes of R1 and R2 will result in slightly different, but generally similar, curves. In addition, if the curve of FIG. 6 is drawn to show D as a percentage of R2 and as a function of ΔA, the curve would be slightly shifted but similar to that shown in FIG. 6.

It should be understood that although the present invention is described with particular specificity and illustrated to show a preferred embodiment of the present invention, alternative embodiments of the present invention should be considered within its scope.

The embodiments of the invention in which an exclusive property or right is claimed are defined as follows:

1. A geartooth sensor, comprising:
   a single sensor, said sensor being responsive to a change in magnetic field strength and being disposed in a first plane; and
   a cylindrical housing having a central axis extending through said sensor, said sensor, said sensor being disposed within said housing and proximate an end face of said housing, said end face being disposed in a second plane, said first and second planes being generally parallel to each other, said housing being insertable along a line and disposable at a location, proximate a rotatable member having at least one discontinuity in its surface, which places said sensor at a predetermined distance from said surface on said line coincident with said central axis which is located at a perpendicular distance from a center of rotation of said rotatable member, said end face being generally perpendicular to a radius of said rotatable member, said perpendicular distance being determined as a function of a range of positions of said sensor relative to said surface.

2. The sensor of claim 1, further comprising:
   said rotatable member.

3. The sensor of claim 1, wherein:
   said sensor comprises a Hall Effect element.

4. The sensor of claim 3, further comprising:
   a magnet disposed proximate said sensor and within said housing.

5. The sensor of claim 1, wherein:
   said perpendicular distance is determined as a function of said range of positions by the relationship $$D = \frac{R1 \cdot R2 \cdot \sin(\Delta A)}{(R1^2 + R2^2 - 2R1 \cdot R2 \cdot \cos(\Delta A))^z}$$

where R1 and R2 are radii from a center of rotation of said rotatable member to said sensor at the limits of said range of positions, $\Delta A$ is the angular difference between R1 and R2, z equals 0.5 and D is said perpendicular distance.

6. A geartooth sensor, comprising:
   a rotatable member having at least one discontinuity in its surface;
   a generally cylindrical housing having a central axis; and
   a sensor being disposed within said housing, said central axis extending through said sensor, said housing being movable along a line to dispose said sensor at a position proximate said surface, said line being coincident with said central axis and being disposed a perpendicular distance from a center of rotation of said rotatable member, said perpendicular distance being determined as a function of a range of possible positions of said sensor from said sensor or rotation, said range of possible positions being a function of the manufacturing tolerances of said rotatable member, said sensor being disposed in a plane generally perpendicular to a radius of said rotatable member.

7. The sensor of claim 6, wherein:
   said sensor comprises a Hall Effect element.

8. The sensor of claim 7, wherein:
   said Hall Effect element comprises a biasing magnet disposed within said generally cylindrical housing.

9. The sensor of claim 6, wherein:
   said perpendicular distance is determined as a function of said range of positions by the relationship $$D = \frac{R1 \cdot R2 \cdot \sin(\Delta A)}{(R1^2 + R2^2 - 2R1 \cdot R2 \cdot \cos(\Delta A))^z}$$

where R1 and R2 are radii from a center of rotation of said rotatable member to said sensor at the limits of said range of positions, $\Delta A$ is the angular difference between R1 and R2, z equals 0.5 and D is said perpendicular distance.

10. A geartooth sensor, comprising:
    a sensor which reacts to changes in the strength of a magnetic field proximate said sensor; and
    a cylindrical housing member having a central axis extending through said sensor, a length and a circular cross section, said sensor being disposed within said housing member at a first end of said length, said sensor being disposable proximate a surface of a rotatable member, said surface having at least one discontinuity, said housing member being disposed with said central axis coincident with a line which extends in nonintersection association with the center of rotation of said rotatable member, the perpendicular distance of said line from said center of rotation being determined as a function of a range of predicted positions of said sensor relative to said surface of said rotatable member, said sensor being disposed in a plane generally perpendicular to a radius of said rotatable member.

11. The sensor of claim 10, wherein:
    said sensor comprises a Hall Effect element.

12. The sensor of claim 11, further comprising:
    a magnet disposed proximate said Hall Effect element within said housing member with said Hall Effect element being disposed between said magnet and said rotatable member.

13. The sensor of claim 12, wherein:
    said central axis is disposed a perpendicular distance from said center of rotation, said perpendicular distance being preselected as a function of a predicted range of positions at different distances between said sensor and said surface when said housing member is rigidly attached proximate said rotatable member.

14. The sensor of claim 13, wherein:
    perpendicular distance is determined as a function of said predicted range of positions by the relationship $$D = \frac{R1 \cdot R2 \cdot \sin(\Delta A)}{(R1^2 + R2^2 - 2R1 \cdot R2 \cdot \cos(\Delta A))^z}$$

R1 and R2 are radii from a center of rotation of said rotatable member to said sensor at the limits of said range of positions, $\Delta A$ is the angular difference between R1 and R2, z equals 0.5 and D is said perpendicular distance.

15. The sensor of claim 1, wherein:
    said discontinuity comprises a magnetic region of said surface.

16. The sensor of claim 6, wherein:
    said discontinuity comprises a magnetic region of said surface.

17. The sensor of claim 10, wherein:
    said discontinuity comprises a magnetic region of said surface.

* * * * *